United States Patent Office 3,767,641
Patented Oct. 23, 1973

3,767,641
PROCESS FOR PREPARING ALLYLIC REARRANGEMENT COMPOUNDS OF ANTIBIOTICS SF-837 AND SF-837A$_2$
Takashi Tsuruoka, Kawasaki, Shunzo Fukatsu and Bunzo Nomiya, Tokyo, and Shigeharu Inoue and Taro Niida, Yokohama, Japan, assignors to Meiji Seika Kaisha, Ltd., Tokyo, Japan
No Drawing. Filed Oct. 27, 1971, Ser. No. 193,180
Claims priority, application Japan, Oct. 27, 1970, 45/93,992
Int. Cl. C07c 129/18
U.S. Cl. 260—210 AB
8 Claims

ABSTRACT OF THE DISCLOSURE

The allylic rearrangement products of antibiotics SF-837 and SF-837A$_2$ are obtained by an acid catalyzed reaction wherein an OH group is shifted from the 9 to the 13 position in aqueous solution.

BACKGROUND OF THE INVENTION

Field of the invention

The present invention relates to a process for preparing novel derivatives of antibiotics SF-837 and SF-837A$_2$; that is, novel antibiotics derived by acting an appropriate catalyst on an original substance to cause an allylic rearrangement.

Description of the prior art

For therapeutic purposes, the free bases, the acid-addition salts and the allylic rearrangement compounds of antibiotics SF-837, SF-837A$_2$, substances of the present invention may conventionally be formulated into tablet or capsule form for oral administration and into aqueous solutions or suspensions for injection, with or without pharmaceutically acceptable additives, such as a carrier, vehicle, suspension agent and the like.

For comparing known macrolide antibiotics the present substance is easily crystallized from conventional organic solvents without a complicated separating procedure and therefore, a pure product can be easily obtained, which is considered to be particularly suitable as an injection preparation. Furthermore, it may readily be understood that the allylic rearrangement compounds of the present invention may be used not only in their isolated form, but also in the form of a mixture of two or more of them for therapeutic purposes.

SF-837 and SF-837A$_2$ substances are novel macrolide antibiotics obtained from a culture liquid of a Streptomyces strain, which is named Streptomyces micarofacience nov. sp. This strain has been deposited in unrestricted form in the ATCC under ATCC No. 21454, by the present inventors (U.S. patent application No. 3,809 filed Jan. 19, 1970). The antibiotics SF-837 and SF-837A$_2$ are useful in the medical treatment of Gram-positive bacterial infections and have the following chemical Structural Formula Ia:

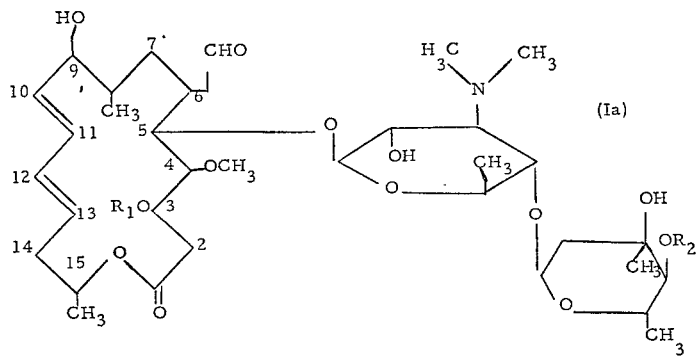

wherein, in SF-837, R$_1$ is —COCH$_2$CH$_3$ and R$_2$ is —COCH$_2$CH$_3$, and, in SF-837A$_2$, R$_1$ is —COCH$_2$CH$_3$ and R$_2$ —COCH$_2$CH$_2$CH$_3$.

SUMMARY OF THE INVENTION

The present inventors have found that, when subjecting the above SF-837 and SF-837A$_2$ substances to an acidic condition in solution, an isomerization reaction resulting in an rearrangement of the hydroxyl group from 9-position of lactone ring in the Formula Ia to the 13-position takes place to produce the novel allylic rearrangement compounds of SF-837 and SF-837A$_2$ represented by the Formula Ib:

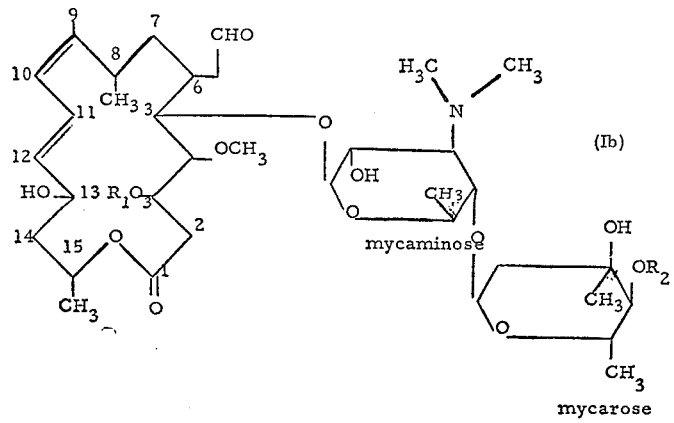

wherein, in the allylic rearrangement compound of the SF-837 substance, R$_1$ is —COCH$_2$CH$_3$ and R$_2$ is

—COCH$_2$CH$_3$ and, in the allylic rearrangement compound of the SF–837A$_2$ substance, R$_1$ is —COCH$_2$CH$_3$ and R$_2$ is —COCH$_2$CH$_2$CH$_3$. Both of the allylic rearrangement compounds of SF–837 and SF–837A$_2$ are novel substances.

Therefore, the present invention is a process for preparing an allylic rearrangement compound of SF–837 or SF–837A$_2$ characterized by acting an acid catalyst on antibiotics SF–837 or SF–837A$_2$ in a solution and subsequently collecting the resulting allylic rearrangement compound of SF–837 or SF–837A$_2$ from the reaction mixture.

The rearrangement from the Compound Ia to the Compound Ib is one kind of equilibrium reaction and the ratio of Ia to Ib is about 6 to 4 under the most favorable condtion.

DETAILED DESCRIPTION OF THE INVENTION

As shown in Formula Ia, SF–837 and SF–837A$_2$ substances are composed of a 16 member cyclolactone, the amino sugar mycaminose and the neutral sugar mycarose, and, in the case where the pH is too low during the reaction, the substances are decomposed, since a hydrolysis reaction occurs with respect to the glycoside bond in the mycarose moiety preferentially to the allylic rearrangement reaction. On the other hand, when the pH is above 5, the allylic rearrangement reaction does not take place (Table 1). That is, the operable pH in the reaction of this invention is within the range of 1 to 4, and most favorably, 2 to 3.5.

As an acid for catalyzing the present reaction, any acid can be utilized regardless of its phase, i.e. liquid, solid or gas, provided that the acid gives the desired pH of 1 to 4 and is stable and inert under reaction conditions. That is, hydrochloric acid, phosphoric acid, hydroiodic acid, hydrobromic acid, acetic acid, propionic acid, monochloracetic acid, trichloroacetic acid, trifluoro acetic acid, tartaric acid, oxalic acid, malonic acid, maleic acid, citric acid, paratoluene sulfuric acid, methasulfonic acid, etc. may be used in the present reaction.

Although the reaction temperature depends upon the concentration of the acid, the operable temperature ranges from 10 to 80° C., and the preferred temperature when the pH ranges from 2 to 3.5 is 15 to 50° C. In general, the higher the reaction temperature is, the shorter the reaction time is, and, if the reaction temperature is lower, the reaction time should be extended (Table 2). The best yield (32%) was obtained under a reaction condition of 3.0 in pH, 50° C. in temperature and 4 hours reaction time. The reaction pressure is satisfactory if it is such a degree as to prevent the reaction solvent from evaporating and commonly the reaction is carried out at atmospheric pressure.

TABLE 1

| Reaction condition | | | Percent of— | | |
| --- | --- | --- | --- | --- | --- |
| pH | Temp., ° C. | Time, hrs. | Ia | Ib | Decomposition product |
| 1.2 | 55 | 1 | 0 | 0 | 100 |
| 2.0 | 55 | 2 | 20 | 15 | 65 |
| 3.0 | 55 | 4 | 45 | 30 | 25 |
| 4.0 | 55 | 4 | 85 | 5 | 10 |
| 5.0 | 55 | 6 | 90 | 2 | 8 |
| 6.0 | 55 | 6 | 80 | 0 | 20 |

Note.—The above values were calculated from the results obtained by separating the reaction material into Ia and Ib by a silica gel thin layer chromatography and thereafter coloring them with sulfuric acid and measuring with a densitometer.

TABLE 1

| Reaction condition | | | Percent of— | | |
| --- | --- | --- | --- | --- | --- |
| pH | Temp., ° C. | Time, days | Ia | Ib | Decomposition product |
| 3.0 | 5 | 2 | 95 | 3 | 2 |
| 3.0 |  | 10 | 77 | 11 | 12 |
| 3.0 | 15 | 2 | 76 | 14 | 10 |
| 3.0 |  | 5 | 45 | 30 | 25 |
| 3.0 | 30 | 2 | 45 | 30 | 30 |
| 3.0 |  | 5 | 12 | 6 | 82 |
| 3.0 | 50 | ¹4 | 38 | 32 | 25 |
| 3.0 |  | ¹20 | 10 | 4 | 86 |
| 3.0 | 80 | ²20 | 18 | 6 | 76 |

¹ Hours.
² Minutes.

In the allylic rearrangement reaction, the presence of water is indispensable. The allylic rearrangement reaction was not observed in an absolute organic solvent of acetone, chloroform, benzene, ethylacetate, ethylether, dioxane, tetrahydrofurane, toluene, etc. The present reaction proceeds in a water-containing solvent, and, as an organic solvent in this case, ethanol, acetone, dioxane and tetrahydrofuran are usually used, which are miscible with water. The water content is desirably above 50% in practice, although the reaction is observed if it is above 5%.

When the reaction is completed the reaction product (allylic rearrangement compounds) and the unreacted raw materials exist as an acid salt, and, in order to separate the reaction product from the mixture, it is most efficient to utilize such a method as converting the both materials to the respective free bases and utilizing the difference of the both free bases in solubility for benzene. That is, such a difference in solubility properties exist that the free base of the allylic rearrangement compound is slightly soluble while the free base of unreacted raw material is easily soluble.

The allylic rearrangement compound is much better in crystallization than the unreacted raw material, and, in case of existing in pure form, it can be easily crystallized out from even a solvent, other than benzene, i.e., from even methanol, ethanol, chloroform, etc. However, in such an impure state of mixture with unreacted material, the object cannot be attained with use of these solvents, but it is most effective to use benzene. That is, when, at the time the reaction is completed, the reaction mixture is adjusted to the alkaline side, i.e., 7 to 9 in pH, and is shaken with an organic solvent, such as ethylacetate, chloroform, ethylether, etc., the reaction product and unreacted raw material are transferred to the organic solvent layer in the form of the free base. Benzene can be utilized in this extraction, although it is inferior to the former in extraction ratio. The pH during extraction may preferably be above 6; howeve, if the pH is higher, a deacylation reaction takes place. Consequently, a pH of above 6 should be avoided. The residue is treated with a small amount of benzene. The synthetic raw materials, SF–837 and SF–837A$_2$ are dissolved and the desired allylic rearrangement compound is separated as an insoluble portion. Then, when the benzene insoluble portion is filtered and crystallized from benzene or acetone, the allylic rearrangement compounds of SF–837 and SF–837A$_2$ are obtained as white needle crystals. The physical and chemical properties of the allylic rearrangement compounds of SF–837 and SF–837A$_2$ of the present invention are as shown in Table 3.

TABLE 3

|  | Allylic rearrangement compound of SF–837 | Allylic rearrangement compound of SF–837A$_2$ |
| --- | --- | --- |
| Appearance | White needles | White needles. |
| Melting point | 205–210° C. | 203–207° C. |
| Elemental analysis | C 60.38, H 8.73, N 1.70% | C 60.68, Hh. 62, N 1.63%. |
| Molecular weight | 813 | 827. |
| Molecular formula | C$_{41}$H$_{67}$O$_{15}$N | C$_{42}$H$_{69}$O$_{15}$N. |
| Ultraviolet absorption | 234 m$\mu$ (E$^{1\%}_{1\,cm}$ 340) Figure 1 | 234 m$\mu$ (E$^{1\%}_{1\,cm}$ 330) Figure 2; |
| Infrared absorption | Figure 3 | Figure 4. |
| Optical rotation | [$a$]$_D^{28}$ −57° (C=1, ethanol) | [$a$]$_D^{28}$ −56° C. (C=1, ethanol). |

Allylic rearrangement compounds of SF–837 and SF–837A$_2$ inhibit the growth of staphylococcus and other Gram positive bacteria in vitro and exhibit the same inhibitory action towards staphylococci having a resistance against streptomycin, actinomycin, kanamycin, penicillin and tetracycline as to the bacteria sensitive strains. Their antibacterial spectrum is shown in Table 4.

TABLE 4

| Test micro-organisms | Minimum inhibitory concentration (mcg./ml.) allylic rearrangement compound of— | |
|---|---|---|
| | SF–837 | SF–837A$_2$ |
| Staphylococcus aureaus 209P | 0.39 | 0.39 |
| Staphylococcus aureaus resistant to (penicillin) | 0.39 | 0.39 |
| Staphylococcus aureus resistant to (streptomycin and A-249 substance) | 0.39 | 0.39 |
| Staphylococcus aureaus resistant to (novobiocin) | 12.5 | 12.5 |
| Staphylococcus aureaus resistant to (kanamycin) | 1.56 | 0.78 |
| Staphylococcus aureus Smith | 0.09 | 0.09 |
| Staphylococcus aureus Terajima | 0.78 | 0.39 |
| Staphylococcus aureus resistant to (streptomycin-tetracycline penicillin) | 0.78 | 0.39 |
| Bacillus subtilis ATCC 6633 | 0.19 | 0.09 |
| Sarcina lutea | 0.05 | 0.05 |
| Mycobacterium smegmatis 607 | 25.0 | 12.5 |
| Escherichia coli | >25.0 | >25.0 |
| Pseudomonas aeruginosa | >25.0 | >25.0 |

Medium: Bouillon, but glycerine bouillon for Mycobacterium. Further, allylic rearrangement compounds of SF–837 and SF–837A$_2$ exhibited an excellent therapeutic effect in an experimental animal infected with a staphylococcal infection. That is, the experimental results for oral administration for mice was as follows:

TABLE 5

| | CD$_{50}$ (mg./kg.) |
|---|---|
| Allylic rearrangement compound of SF–837 | 80 |
| Allylic rearrangement compound of SF–837A$_2$ | 70 |
| SF–837 | 160 |
| SF–837A$_2$ | 150 |
| Kitasamycin | 190 |
| Spiramycin | 240 |

In the oral administration of 6 g./kg. of the allylic rearrangement compound no deaths to the mice employed was observed. Thus, it should be noted that allylic rearrangement compounds of SF–837 and SF–837A$_2$ are lower in toxicity and exhibit a more excellent effect in the treatment of staphylococcus infections than the original substances and kitasamycin.

Furthermore since the allylic rearrangement compounds of SF–837 and SF837A$_2$ are obtained in pure form without a complicated separatory procedure, it is possible to use these compounds in a preparation for parental use.

The present invention will be further illustrated by the following example, which are merely intended to be illustrative and not limitative of the present invention.

EXAMPLE 1

One gram of SF–837 substance was dissolved in hydrochloric acidic water (adjusted to pH 3.0) and heated at 55° C. for 4 hours. The reaction liquid was adjusted to a pH of 8.0 with sodium hydroxide and extracted with 50 ml. of ethyl acetate. The ethyl acetate layer was evaporated to dryness under reduced pressure and dissolved in 5 ml. of benzene. The benzene insoluble portion was filtered, dissolved in 4 ml. of acetone and allowed to stand at 5° C. to deposit crystals. The crystals were filtered and dried in a desiccator to obtain 280 mg. of white needle crystals of the allylic rearrangement compound of SF–837.

The result of the experiment carried out with inorganic acids, other than hydrochloric acid under similar conditions is shown in the following table:

TABLE 6

| | Reaction condition | | | |
|---|---|---|---|---|
| Inorganic acid | pH | Temp., °C. | Time, hours | Yield, percent |
| Sulfuric acid | 3.0 | 55 | 4 | 30 |
| Phosphoric acid | 3.0 | 53 | 4 | 26 |
| Hydroiodic acid | 2.8 | 49 | 5 | 24 |
| Hydrobromic acid | 2.5 | 50 | 3.5 | 23 |

EXAMPLE 2

Five hundred milligrams of SF–837A$_2$ was dissolved in 30 ml. of 0.1 M acetic acid (pH 2.8) and reacted at 50° C. for 3 hours. After neutralization, the reaction liquid was extracted with 30 ml. of chloroform. The solvent layer was concentrated and dried and treated with 3 ml. of benzene to filter the insoluble portion. This portion was dissolved in 10 ml. of hot benzene and allowed to stand at room temperature to deposit crystals. The crystals were dried in a desiccator to obtain 120 mg. of white needle crystals of the allylic rearrangement compound of SF–837A$_2$.

The result of this experiment carried out with organic acids, other than acetic acid under similar conditions is shown in the following table:

TABLE 7

| | Reaction condition | | | |
|---|---|---|---|---|
| Organic acid | pH | Temp., °C. | Time, hours | Yield, percent |
| Propionic acid | 3.8 | 60 | 6 | 21 |
| Monochloro acetic acid | 2.8 | 52 | 3.5 | 23 |
| Trichloro acetic acid | 3.0 | 55 | 4.0 | 24 |
| Trifluoro acetic acid | 2.5 | 48 | 3.5 | 23 |
| Tartaric acid | 3.2 | 50 | 4 | 27 |
| Oxalic acid | 2.8 | 50 | 4.5 | 20 |
| Malonic acid | 3.2 | 55 | 4.0 | 25 |
| Maleic acid | 3.5 | 60 | 4.5 | 26 |
| Citric acid | 2.8 | 52 | 4.0 | 18 |
| Paratoluene sulfonic acid | 2.5 | 48 | 5.0 | 16 |
| Methasulfuric acid | 3.0 | 55 | 4.0 | 22 |

EXAMPLE 3

Two grams of SF–837 was dissolved in 50 ml. of a 50% aqueous acetone solution and adjusted to a pH of 3 with sulfuric acid, and reacted at 40° C. for 8 hours. After neutralization, the reaction liquid was distilled out acetone under reduced pressure and extracted with 30 ml. of ethyl acetate. The ethyl acetate layer was concentrated under reduced pressure and the residue was dissolved in 8 ml. of benzene. The insoluble portion was dissolved in 10 ml. of acetone and allowed to stand at 5° C. to deposit crystals. The crystals were dried to obtain 500 mg. of white needle crystals of the allylic rearrangement compound of SF–837.

The result of this experiment carried out under other conditions is shown in the following table:

TABLE 8

| | Reaction condition | | | |
|---|---|---|---|---|
| Solvent system | pH | Temp., °C. | Time, hours | Yield, percent |
| Acetone-water: | | | | |
| 8:1 | 3.0 (hydrochloric acid) | 50 | 6 | 5 |
| 4:1 | do | 50 | 6 | 12 |
| 2:1 | do | 50 | 6 | 20 |
| 1:2 | do | 50 | 6 | 27 |
| Dioxane-water: | | | | |
| 2:1 | 2.8 (sulfuric acid) | 58 | 6 | 18 |
| 1:1 | do | 58 | 6 | 22 |
| 1:2 | do | 58 | 6 | 25 |
| Tetrahydrofurane-water 1:1 | 2.5 (sulfuric acid) | 60 | 4.5 | 22 |

What is claimed is:

1. A process for preparing the allylic rearrangement compounds of a member selected from the group consisting of antibiotics SF–837 and SF–837A$_2$, which comprises the following stepwise procedure:
   (1) subjecting antibiotics SF–837 or SF–837A$_2$ contained in a member selected from the group consisting of water and a water-containing organic solvent to acid catalysis, and
   (2) subsequently, recovering the allylic rearrangement compound of antibiotic SF–837 or antibiotic SF–837A$_2$ from the reaction mixture, said acid catalysis taking place in the presence of an acid pH.

2. The process of claim 1, wherein said pH ranges from 1 to 4.

3. The process of claim 1, wherein said pH ranges from 2.0–3.5.

4. The process of claim 1, wherein said acid catalysis is produced by an acid selected from the group consisting of HCl, H$_3$PO$_4$, HI, HBr, CH$_3$COOH, CH$_3$CH$_2$COOH, CH$_2$ClCOOH, CCl$_3$COOH, CF$_3$COOH, tartaric acid, oxalic acid, malonic acid, maleic acid, citric acid, p-toluene sulfuric acid, and metha-sulfonic acid.

5. The process of claim 1, wherein said process takes place at a temperature ranging from 10° to 80° C.

6. The process of claim 3, wherein said process takes place at a temperature of from 15° to 50° C.

7. The process of claim 1, wherein said process takes place at a pH of 3.0, a temperature of 50° C. and for a time of 4.0 hours.

8. The process of claim 1, wherein said water-containing organic solvent is a member selected from the group consisting of ethanol, acetone, dioxane, and tetrahydrofuran.

References Cited
UNITED STATES PATENTS 3,535,309   10/1970   Hata et al. _____ 260—210 AB LEWIS GOTTS, Primary Examiner J. R. BROWN, Assistant Examiner U.S. Cl. X.R.

424—180